April 21, 1970 R. S. BOLDUC 3,507,287
CHAFF SAMPLER FOR COMBINES
Filed Aug. 4, 1967 2 Sheets-Sheet 1

Robert S. Bolduc
INVENTOR.

BY *Clarence A. O'Brien*
*and Harvey B. Jacobson*
Attorneys

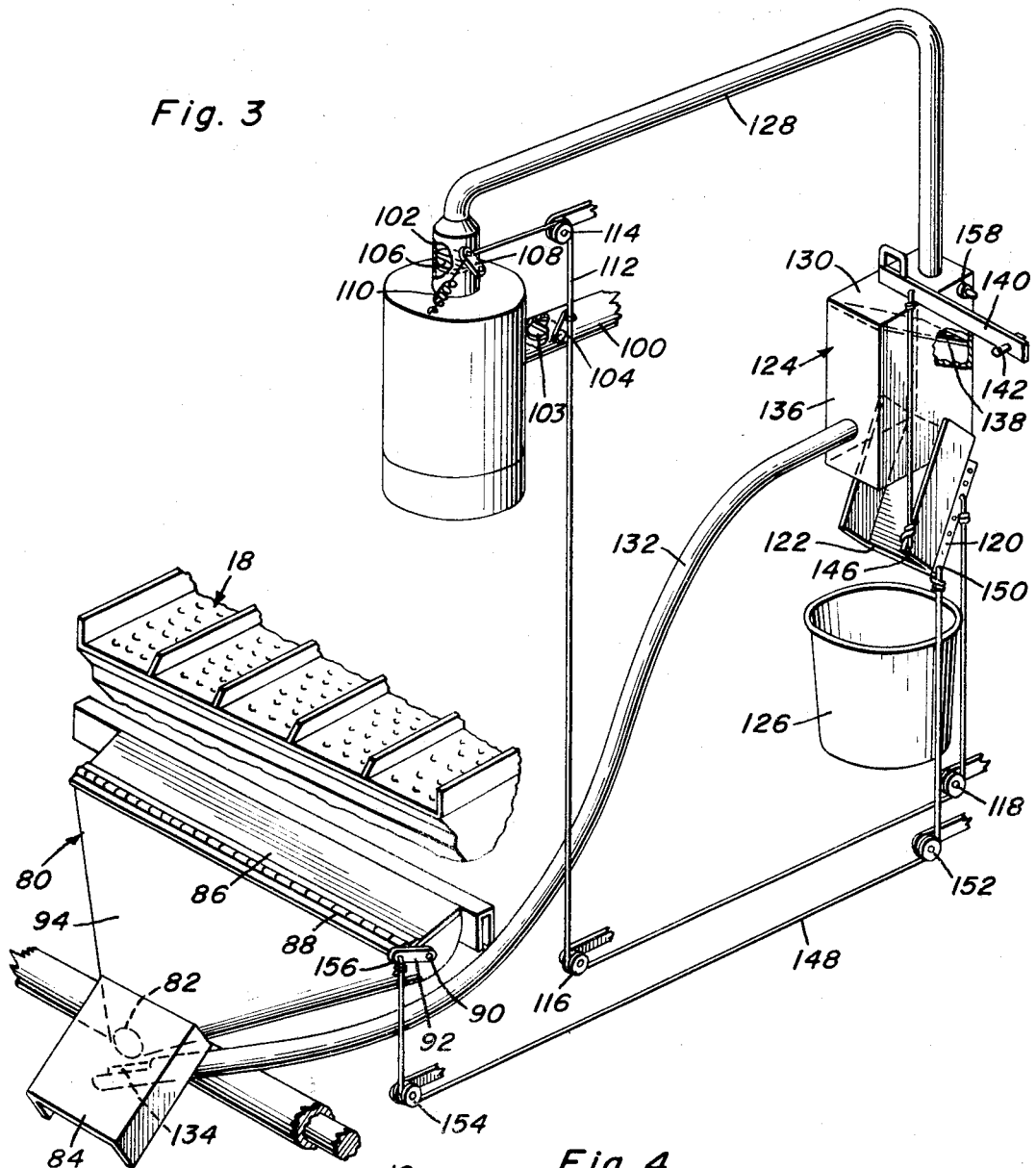

United States Patent Office 3,507,287
Patented Apr. 21, 1970

3,507,287
CHAFF SAMPLER FOR COMBINES
Robert S. Bolduc, Stephen, Minn. 56757
Filed Aug. 4, 1967, Ser. No. 658,525
Int. Cl. A01f 12/00
U.S. Cl. 130—26
17 Claims

ABSTRACT OF THE DISCLOSURE

A receptacle for mounting on a combine including means defining a chaff accumulation area and a source of vacuum with means communicating the interior of the receptacle with the source of vacuum and airflow passage means including an inlet end disposed to draw in chaff from the chaff accumulation area and an outlet end opening into the receptacle, the source of vacuum comprising the air intake passages of a combustion engine mounted on the combine and comprising the prime source of power for the combine and filter means disposed between the outlet end of the airflow passage means or conduit opening into the receptacle and the combustion engine intake passages whereby chaff drawn into the receptacle by engine vacuum will not be carried from the receptacle into the intake passages of the engine.

---

Figure 1:
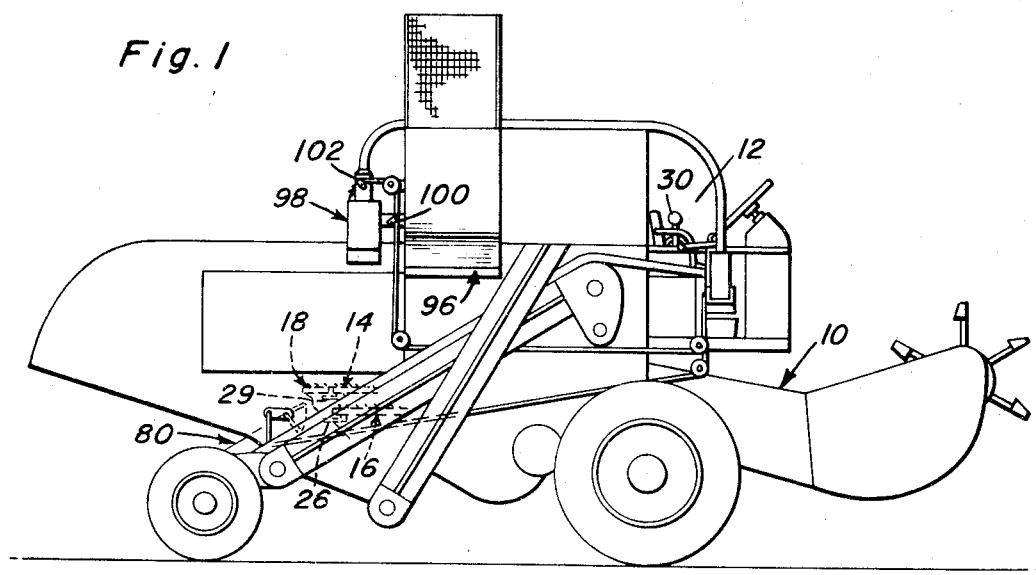

The chaff sampler of the instant invention has been constructed so as to be readily adaptable for use on substantially all combines with a minimum amount of modification of the combines being required and includes components thereof enabling the driver of the associated combine to obtain a sample of the chaff being discharged from the combine at any time he desires during operation of the combine and without having to rely upon the complex mechanisms for obtaining the sample of chaff or any supplemental power source for operating such mechanisms.

The chaff sampler includes merely a vacuum line including an inlet end disposed to draw a sample of chaff from a chaff accumulation area of the associated combine and an outlet end opening into a receptacle including a selectively openable gravity discharge outlet and whose interior includes an air filter disposed above the gravity discharge outlet and has its upper portion above the filter communicated with a source of engine vacuum of an internal combustion engine comprising the prime source of power for the associated combine. By this structure, the communication of the upper portion of the interior of the receptacle with the source of engine vacuum may be selectively initiated and subsequently terminated so as to draw chaff into the receptacle after which the selectively openable gravity discharge outlet may be opened for noting the condition and volume of chaff sampled.

The main object of this invention is to provide a chaff sampler for a combine which may be readily actuated whenever desired and operable, when actuated, to provide the driver of the combine with a sample of the chaff being discharged from the combine at a position closely adjacent the driver's position on the combine.

Another object of this invention is to provide a chaff sampler in accordance with the preceding object and constructed in a manner whereby it may be readily incorporated into the manufacture of substantially all types of combines being presently manufactured and also added to existing combines as an attachment therefor with very little modification of existing combines being necessary.

Still another object of this invention is to provide a chaff sampler in accordance with the preceding objects and including chaff conveying means operable independently of any drive train from the output shaft of the prime mover of the associated combine.

A final object of this invention to be specifically enumerated herein is to provide a chaff sampler in accordance with the preceding objects which will conform to conventional forms of manufacture, be of simple construction and easy to use so as to provide a device that will be economically feasible, long lasting and relatively trouble-free in operation.

Figure 2:
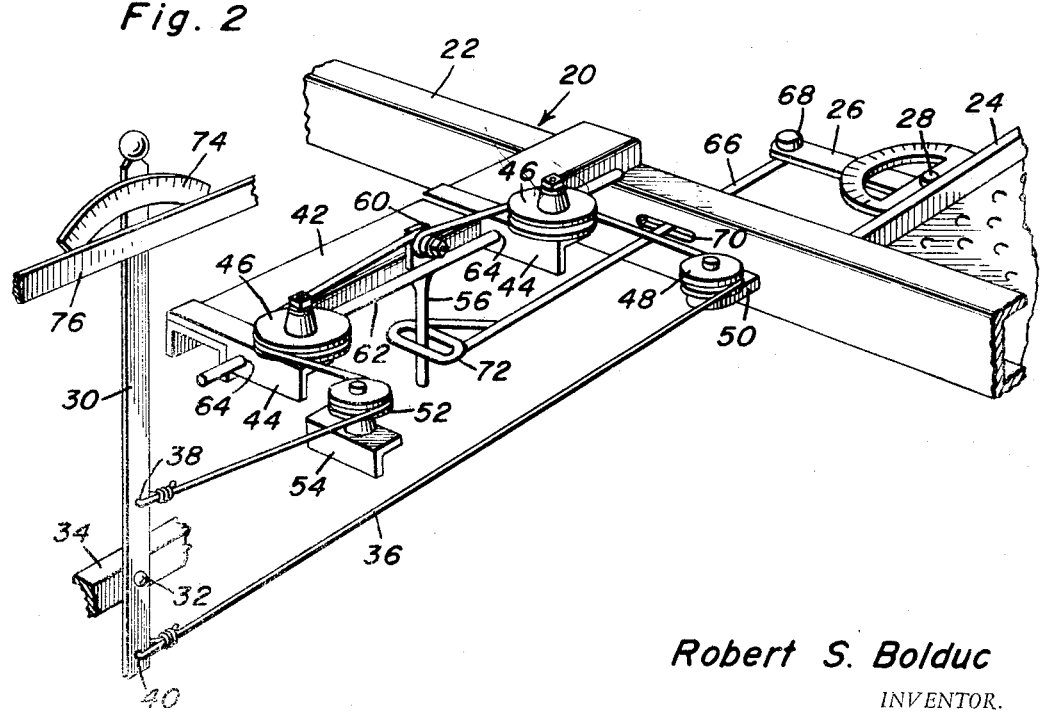

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of combine on which the chaff sampler of the instant invention is mounted;

FIGURE 2 is a fragmentary perspective view of the portion of the chaff sampler construction which may be utilized to actuate the sieve adjusting lever of a combine from a remote location in accordance with the sieve adjustments deemed necessary in light of the condition of chaff sampled by the chaff sampler and with the sieve adjusting the lever control assembly operatively supported from frame portions of the combine and connected to the sieve adjusting lever;

FIGURE 3 is a perspective view of the chaff sampling components of the instant invention including the actuating lever therefor and with the various components of the chaff sampling structure operatively associated with the related portions of the associated combine which are only fragmentarily illustrated; and FIGURE 4 is a fragmentary side elevational schematic view of the chaff accumulating funnel in operative position to receive chaff from the chaffer extension or tailings finger bar of the associated combine and with the hinged deflector of the chaff gathering funnel in a closed position.

Referring now more specifically to the drawings, the numeral 10 generally designates a conventional form of combine including a driver's or operator's position 12 adjacent the front end of the combine 10. The combine 10 further includes a conventional chaffer generally referred to by the reference numeral 14, a cleaning sieve generally referred to by the reference numeral 16 and a chaffer extension or tailings finger bar generally referred to by the reference numeral 18. Further, the combine 10 includes a main frame generally referred to by the reference numeral 20 including a longitudinal member 22 and a transverse portion 24 from which a cleaning sieve adjusting lever 26 is pivotally supported as at 28. The combine 10, in addition to being provided with the cleaning sieve adjusting lever 26, is also provided with a similar chaffer adjusting lever 29 for the chaffer.

The combine 10 includes a pair of similar levers 30 pivotally supported as at 32 from any desired frame portion 34 of the combine 10 adjacent the operator's position 12 and each of the levers 30 has the opposite end portions of an elongated flexible tension member 36 secured thereto as at 38 and 40. Although only one of the levers 30 is illustrated in detail in FIG. 2 of the drawings as being operatively connected to the cleaning sieve adjusting lever 26, it is to be understood that two such levers are provided and that the second lever 30 is operatively connected to the chaffer adjusting lever 29 by substantially the same structure to be described hereinafter by which the lever 30 illustrated in FIG. 2 is connected to the sieve adjusting lever 26.

A transversely extending and generally horizontally disposed elongated support member 42 is supported from the longitudinal member 22 at one end and projects laterally outwardly of the longitudinal member 22. The support member 42 includes a pair of laterally directed arms 44 from which a pair of similar pulleys 46 are journaled for rotation about vertical axes and a third pulley 48 is journaled from a support 50 attached to the longitudinal member 22 while a fourth pulley 52 is journaled from yet another support member 54 suitably secured to any portion of the frame of the combine 10. The tension member 36 extends about the pulley 48, the pulleys 46 and then about the pulley 52 and the portion of the tension member 36 extending between the pulleys 46 is anchored to a vertical arm 56 as at 60. The vertical arm 56 is carried by and includes a lower end which depends from a horizontally disposed elongated member centrally intermediate its opposite ends, the opposite end portions of the elongated member 62 being slidably received through apertures 64 provided in the arms 44.

A connecting lever 66 has one end thereof pivotally secured to the free swinging end of the sieve adjusting lever 26 as at 68 and the connecting lever 66 extends through a slot 70 formed in the longitudinal member 22 and has its end remote from the sieve adjusting lever 26 operatively connected to the lower end of the arm 56 by means of an oval horizontally disposed eye portion 72 carried on the end of the connecting link 66 remote from the lever 26 and through which the lower end portion of the arm 56 projects. Further, a sector plate 74 is suitably supported from another frame portion 76 of the combine 10 adjacent the operator's position 12 in any suitable manner and with which the free swinging end portion of the lever 30 adapted to be engaged by the operator of the combine 10 is registrable whereby the lever 30 may be positioned in any predetermined angularly displaced position thereof. Any suitable means may be provided to positively or frictionally retain the lever 30 in adjusted rotated positions. Of course, the preceding description of the lever 30 connected to the lever 26 also applies to the second lever 30 operatively connected to the chaffer adjusting lever 29.

In view of the foregoing, it may be seen that both the chaffer and the cleaning sieve may be adjusted from the operator's position 12 on the forward end of the combine 10 and during operation of the latter.

With attention now invited more specifically to FIGS. 3 and 4 of the drawings, there may be seen a chaff gathering funnel referred to in general by the reference numeral 80 and which is supported from the rear of the combine 10 in any convenient manner. The chaff gathering funnel 80 is positioned in a rearwardly and downwardly inclined position and is provided with an outlet opening 82 at its lower end which is covered by an inverted generally U-shaped and rearwardly and downwardly inclined shield 84 supported from the funnel 80. The larger forwardly and upwardly disposed end of the funnel 80 has a hinged deflector plate or cover 86 swingably supported therefrom by means of a hinge assembly 88. The deflector plate or cover 86 includes an axle portion 90 with which the cover 86 is swingable and an actuating lever 92 has one end thereof secured to the axle portion for rotation therewith. Further, the cover 86 is spring-biased, in any suitable manner (not shown), toward the closed position.

The larger upwardly and forwardly disposed end of the funnel 80 is positioned in vertically spaced relation beneath the rear end of the chaffer extension or tailing finger bar 18 so that chaff being discharged from the bar 18 will fall downward onto the upper end of the funnel 80. If the deflector plate or cover 86 is closed, the chaff will flow downwardly over the outer surface of the rearwardly and upwardly facing upper wall 94 of the funnel 80 and over the shield 84. However, if the deflector plate or cover 86 is partially open, a portion of the chaff being discharged from the chaffer extension or tailings finger bar 18 will fall into the open upper end of the funnel 80 and flow downwardly through the latter toward the outlet opening 82 thereof from which the gathered chaff will be subsequently discharged.

The combine 10 includes a prime mover in the form of an internal combustion engine generally referred to by the reference numeral 96 and which includes an air cleaner assembly referred to in general by the reference numeral 98. The air cleaner assembly 98 conventionally includes an air inlet pipe 100 through which air from the ambient atmosphere may be drawn into the air cleaner assembly 98 and a supplemental air inlet 102 provided for a precleaner attachment for the air cleaner assembly 98. The conventional air inlet 100 has a normally open butterfly valve 103 installed therein including an actuating lever 104 and the supplemental air inlet has a normally closed butterfly valve 106 installed therein including an actuating lever 108 which is spring-urged toward a position with the butterfly valve 106 closed by means of an expansion spring 110. The free ends of the actuating levers 104 and 108 are connected by means of an elongated tension member 112 and the tension member 112 is entrained over pulleys 114, 116, and 118 and has the end thereof remote from the levers 104 and 108 secured to a depending apertured flange portion 120 of a generally channel-shaped bottom wall 122 of a receptacle generally referred to by the reference numeral 124, the bottom wall 122 being hinged from the bottom of the receptacle 124 for swinging movement to and from a position closing the bottom of the receptacle 124. When the bottom wall 122 is swung to an open position such as that illustrated in FIG. 3 of the drawings, it forms a chute inclined downwardly toward a suitable bucket or container 126 into which chaff disposed within the receptacle 124 may be discharged whenever the bottom wall 122 is swung to the open position.

The supplemental air inlet 102 is communicated with the interior of the upper portion of the receptacle by means of a vacuum conduit 128 whose inlet end opens downwardly through the top wall 130 of the receptacle 124 and a vacuum tube or pipe 132 is mounted with its inlet end 134 positioned to receive chaff being discharged outwardly of the lower opening 82 in the funnel 80. The outlet end of the tube 132 opens into the lower portion of the interior of the receptacle 124 through a side wall 136 thereof and an air filter panel and partition 138 is disposed in the receptacle 124 between the outlet end of the vacuum tube 132 and the inlet end of the vacuum conduit 128.

An actuating or operating lever 140 is pivotally supported from any suitable portion of the combine 10 by means of a pivot fastener 142 and has one end of a tension member 144 secured thereto, the other end of the tension member 144 being attached to the free swinging edge portion of the bottom wall 122 as at 146.

A third tension member 148 has one end which is also secured to the free swinging edge portion of the bottom wall 122 as at 150 and is trained about pulleys 152 and 154 suitably journaled from the combine 10. The end of the tension member 148 remote from the free swinging edge portion of the bottom wall 122 is secured to the lever 92 carried by the axle portion 90 as at 156.

Further, the receptacle 124 includes a vacuum release air inlet valve 158 operable to admit air into said receptacle downstream from the air filter panel 138 in the event the panel becomes excessively clogged with chaff.

As hereinbefore set forth, the levers 30, only one of which has been specifically illustrated, are disposed adjacent the operator's position 12 and the lever 140 is also to be positioned adjacent the operator's position 12. If, during operation of the combine 10 a sample of chaff is desired, the lever 140 may have its free end swung upwardly and retained upwardly displaced for about five or ten seconds so as to close the bottom wall 122, raise the deflector plate or closure 86, and close the valve 103 while opening the valve 106. This of course will cause a vacuum to exist in the vacuum conduit 128, the receptacle 124 and the vacuum tube 132 thereby causing the chaff being discharged from the tailings finger bar 18 and passing through the funnel 80 to be discharged from the outlet opening 82 thereof to be drawn into the inlet end 134 of the vacuum tube 132. The chaff drawn into the vacuum tube 132 will be conveyed into the receptacle 124 and prevented from passing into the vacuum conduit 128 by means of the filter baffle 138. Thereafter, the operator may release the free end of the lever 140 so as to enable it to be returned to the lowered position thereof illustrated in FIG. 3 of the drawings thereby again opening the valve 103 and closing the valve 106, closing the deflector plate or cover 86 and lowering the free swinging edge portion of the bottom wall 122 so as to dump the collected chaff from within the reservoir 124 into the container 126. Then, according to the condition of the chaff discharged into the container 126, which collected chaff may be readily inspected by the operator of the combine 10, the operator may adjust the levers 26 and 29 for the sieve 16 and the chaffer 14 as desired by adjusting the levers 30 and/or adjust the forward ground speed of the combine 10.

If it is possible, the vacuum tube 132 is mounted on the combine 10 so as to be continuously downwardly inclined toward the inlet end 134 thereof. In this manner, after each sampling of chaff, vibration of the combine 10 will cause chaff remaining in the vacuum tube 132 to be discharged outwardly of the inlet end 134 thereof. If it is not possible to mount the vacuum tube 132 in a continuously downwardly inclined position toward the inlet end 134 thereof, then the next sample of chaff obtained is discarded so as to purge the vacuum tube 132 of all remaining portions of the last sample of chaff obtained. Then, a third sample of chaff is obtained and inspected after which the levers 30 may be adjusted as desired.

The inlet end 134 of the vacuum tube 132 is cut on a bias so as to form a slightly trough-shaped end portion immediately beneath the round outlet opening 82 of the funnel 80. In this manner, chaff being discharged from the opening 82 will fall onto the trough-shaped inlet end of the vacuum tube 132 and be readily drawn through the latter. Of course, various assemblages could be utilized for providing for adjustment of the levers 26 and 29 from remote locations such as the operator's position 12. However, the mechanism illustrated in FIG. 2 of the drawings has been found to provide this necessary means of adjusting the levers 26 and 29 from a remote location and has proven to be trouble-free in operation. In addition, other means of actuating the values 103 and 106, opening and closing the deflector plate 86 and lowering and raising the free swinging edge portion of the bottom wall 122 could be provided. The inlet end 134 of the vacuum tube 132 is spaced slightly below the outlet opening 82 so as to allow accumulated chaff to fall from both the funnel 80 and the vacuum tube 132 after a chaff sampling operation has been terminated. Further, the free swinging edge portion of the deflector plate 86 rests below the flow of chaff from the tailings finger bar 18 when the deflector plate 86 is in the closed position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a combine including means defining a chaff accumulation area and a source of vacuum, a chaff sampler including a receptacle, means communicating the interior of said receptacle with said source of vacuum, and airflow passage means including an inlet end disposed to draw in chaff from said accumulation area and an outlet end opening into said receptacle.

2. The combination of claim 1 wherein said receptacle includes a selectively openable gravity discharge outlet for gravitational discharge of chaff from said receptacle.

3. The combination of claim 1 wherein said source of vacuum comprises an air intake passage of a combustion engine mounted on said combine and in which air is present under a pressure less than ambient atmospheric pressure during operation of said combustion engine.

4. The combination of claim 3 including filter means disposed between said outlet end and said combustion engine intake passage.

5. The combination of claim 4 wherein said combustion engine comprises the prime source of power for said combine.

6. The combination of claim 1 wherein said source of vacuum comprises an air intake passage of a combustion engine mounted on said combine and in which air is present under a pressure less than ambient atmospheric pressure during operation of said combustion engine, and filter means disposed in said receptacle dividing the latter into two separate chambers, said outlet end opening into one of said chambers and said intake passage of said combustion engine being communicated with the interior of said receptacle through the other of said chambers.

7. The combination of claim 6 wherein said receptacle includes a selectively openable gravity discharge outlet for gravitational discharge of chaff from said one chamber.

8. The combination of claim 7 wherein said receptacle includes an open bottom defining said gravity discharge outlet and a hinged bottom wall swingable toward and away from a position closing the open bottom of said receptacle, said other chamber being spaced above the bottom wall of said receptacle.

9. The combination of claim 1 wherein said means communicating the interior of said receptacle with said source of vacuum includes means operative to selectively terminate communication of the interior of said receptacle with said source of vacuum.

10. In combination with a combine including an operator's position and remotely disposed chaffer and sieve adjusting members, a pair of movable control members supported from said combine adjacent said operator's position, and motion transmitting means operatively connected between said control members and said adjusting members for adjustment of the latter by movement of said control members adjacent said operator's position, said combine including an area in which chaff is accumulated remote from said operator's position, intermittently actuatable chaff conveying means including an inlet end in said area for receiving chaff to be conveyed and an outlet end adjacent said operator's position, said conveying means being operative, when actuated, to selectively convey a sample of chaff from said area to said outlet end adjacent said operator's position.

11. In combination with a combine including an operator's position and remotely disposed chaffer and sieve adjusting members, a pair of movable control members supported from said combine adjacent said operator's position, and motion transmitting means operatively connected between said control members and said adjusting members for adjustment of the latter by movement of said control members adjacent said operator's position, said combine including an area in which chaff is accumulated remote from said operator's position, and chaff sampling means operative to selectively obtain a sample of chaff from said area and convey said sample from said area to a point adjacent said operator's position, said combine including a source of vacuum, said chaff sampling means including a receptacle, means communicating the interior of said receptacle with said source of vacuum, and airflow passage means including an inlet end disposed to draw in chaff from said accumulation area and an outlet end opening into said receptacle.

12. The combination of claim 11 wherein said receptacle includes a selectively openable gravity discharge outlet for gravitational discharge of chaff from said receptacle.

13. The combination of claim 11 wherein said source of vacuum comprises an air intake passage of a combustion engine mounted on said combine and in which air is present under a pressure less than ambient atmospheric pressure during operation of said combustion engine.

14. The combination of claim 13 including filter means disposed between said outlet end and said combustion engine intake passage.

15. The combination of claim 11 wherein said source of vacuum comprises an air intake passage of a combustion engine mounted on said combine and in which air is present under a pressure less than ambient atmospheric pressure during operation of said combustion engine, and filter means disposed in said receptacle dividing the latter into two separate chambers, said outlet end opening into one of said chambers and said intake passage of said combustion engine being communicated with the interior of said receptacle through the other of said chambers.

16. The combination of claim 15 wherein said receptacle includes a selectively openable gravity discharge outlet for gravitational discharge of chaff from said one chamber.

17. The combination of claim 11 wherein said combine includes a source of vacuum, said conveying means including an elongated tubular member having a first inlet end thereof disposed in said area and a second outlet end thereof disposed at a point adjacent said operator's position, said source of vacuum being communicated with said outlet end of said tubular member.

References Cited

UNITED STATES PATENTS

| | | | |
|---|---|---|---|
| 2,266,805 | 12/1941 | Ronning | 130—27 |
| 2,292,958 | 8/1942 | Millard et al. | 56—21 |
| 2,528,275 | 10/1950 | Heth | 56—21 |
| 2,887,226 | 5/1959 | Angus | 130—24 |

ANTONIO F. GUIDA, Primary Examiner